United States Patent
Everly et al.

(10) Patent No.: US 11,028,759 B2
(45) Date of Patent: *Jun. 8, 2021

(54) SYSTEM AND METHOD FOR AXIAL ZONING OF HEATING POWER

(71) Applicant: WATLOW ELECTRIC MANUFACTURING COMPANY, St. Louis, MO (US)

(72) Inventors: Mark D. Everly, St. Charles, MO (US); James Pradun, Lake Geneva, WI (US); Sanhong Zhang, Ballwin, MO (US)

(73) Assignee: Watlow Electric Manufacturing Company, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/871,914

(22) Filed: May 11, 2020

(65) Prior Publication Data

US 2020/0271037 A1  Aug. 27, 2020

Related U.S. Application Data

(63) Continuation of application No. 15/448,044, filed on Mar. 2, 2017, now Pat. No. 10,648,390.
(Continued)

(51) Int. Cl.
*F01N 13/00* (2010.01)
*F01N 9/00* (2006.01)
(Continued)

(52) U.S. Cl.
CPC ............. *F01N 9/005* (2013.01); *F01N 3/023* (2013.01); *F01N 3/027* (2013.01); *F01N 3/2006* (2013.01);
(Continued)

(58) Field of Classification Search
CPC .. F01N 11/002; F01N 11/005; F01N 13/0097; F01N 3/023; F01N 3/027;
(Continued)

(56) References Cited

U.S. PATENT DOCUMENTS 5,259,190 A * 11/1993 Bagley ............... B01D 46/0063
60/300
5,465,573 A * 11/1995 Abe ..................... F01N 13/0097
60/274

(Continued)

FOREIGN PATENT DOCUMENTS

CN 101392673 3/2009
CN 101609342 12/2009
(Continued)

OTHER PUBLICATIONS

Japan Office Action dated Feb. 2, 2021 with it's English Translation, issued in Japan Application No. 2018-545959, 7 pages.

*Primary Examiner* — Matthew T Largi
(74) *Attorney, Agent, or Firm* — Burris Law, PLLC

(57) ABSTRACT

A heater system for an exhaust system is provided. The heater system includes a heater disposed in an exhaust conduit. The heater includes a plurality of heating elements disposed in the exhaust conduit. A heating control module controls the plurality of heating elements differently according to operating conditions specific to each heating element. In other forms, the heater system for an exhaust system has a plurality of heating zones, instead of a plurality of heating elements. The heating control module controls the plurality of heating zones differently according to operating conditions specific to each heating zone.

20 Claims, 6 Drawing Sheets

Related U.S. Application Data

(60) Provisional application No. 62/302,482, filed on Mar. 2, 2016.

(51) Int. Cl.

| | | |
|---|---|---|
| *F01N 11/00* | (2006.01) | |
| *F01N 3/027* | (2006.01) | |
| *G01F 1/68* | (2006.01) | |
| *H05B 1/02* | (2006.01) | |
| *F02D 41/02* | (2006.01) | |
| *F02D 41/14* | (2006.01) | |
| *G05D 23/185* | (2006.01) | |
| *F01N 3/20* | (2006.01) | |
| *F02D 41/22* | (2006.01) | |
| *G01M 15/05* | (2006.01) | |
| *G07C 5/08* | (2006.01) | |
| *H05B 3/20* | (2006.01) | |
| *H05B 3/40* | (2006.01) | |
| *G01K 7/16* | (2006.01) | |
| *G05D 23/24* | (2006.01) | |
| *G05D 23/30* | (2006.01) | |
| *H05B 3/14* | (2006.01) | |
| *G01F 1/86* | (2006.01) | |
| *H05B 3/18* | (2006.01) | |
| *H05B 3/00* | (2006.01) | |
| *F01N 3/023* | (2006.01) | |
| *F01N 3/10* | (2006.01) | |
| *F01N 3/021* | (2006.01) | |
| *F01N 3/08* | (2006.01) | |
| *H01C 7/02* | (2006.01) | |
| *H01C 7/04* | (2006.01) | |

(52) U.S. Cl.
CPC .............. *F01N 3/2013* (2013.01); *F01N 9/00* (2013.01); *F01N 9/002* (2013.01); *F01N 11/002* (2013.01); *F01N 11/005* (2013.01); *F01N 13/0097* (2014.06); *F02D 41/024* (2013.01); *F02D 41/1446* (2013.01); *F02D 41/1447* (2013.01); *F02D 41/22* (2013.01); *F02D 41/222* (2013.01); *G01F 1/68* (2013.01); *G01F 1/86* (2013.01); *G01K 7/16* (2013.01); *G01M 15/05* (2013.01); *G05D 23/185* (2013.01); *G05D 23/2401* (2013.01); *G05D 23/30* (2013.01); *G07C 5/0808* (2013.01); *H05B 1/0227* (2013.01); *H05B 1/0244* (2013.01); *H05B 3/0042* (2013.01); *H05B 3/141* (2013.01); *H05B 3/18* (2013.01); *H05B 3/20* (2013.01); *H05B 3/40* (2013.01); *F01N 3/021* (2013.01); *F01N 3/0814* (2013.01); *F01N 3/103* (2013.01); *F01N 3/106* (2013.01); *F01N 3/2066* (2013.01); *F01N 2240/10* (2013.01); *F01N 2240/16* (2013.01); *F01N 2240/36* (2013.01); *F01N 2410/00* (2013.01); *F01N 2410/04* (2013.01); *F01N 2550/22* (2013.01); *F01N 2560/06* (2013.01); *F01N 2560/07* (2013.01); *F01N 2560/12* (2013.01); *F01N 2560/20* (2013.01); *F01N 2610/102* (2013.01); *F01N 2900/0416* (2013.01); *F01N 2900/1404* (2013.01); *F01N 2900/1406* (2013.01); *F01N 2900/1411* (2013.01); *F01N 2900/1602* (2013.01); *F02D 2041/1433* (2013.01); *F02D 2041/228* (2013.01); *F28F 2200/00* (2013.01); *G01K 2205/04* (2013.01); *H01C 7/02* (2013.01); *H01C 7/04* (2013.01); *H05B 2203/019* (2013.01); *H05B 2203/021* (2013.01); *H05B 2203/022* (2013.01); *Y02T 10/12* (2013.01); *Y02T 10/40* (2013.01)

(58) Field of Classification Search
CPC ........ F01N 3/2006; F01N 3/2013; F01N 9/00; F01N 9/002; F02D 41/22; F02D 41/222; G01K 13/00; G01K 7/00; G01K 7/16; G01M 15/05; G05D 23/2401
See application file for complete search history.

(56) References Cited

U.S. PATENT DOCUMENTS

| | | | |
|---|---|---|---|
| 5,597,503 A * | 1/1997 | Anderson | F01N 13/0097 219/552 |
| 5,697,155 A * | 12/1997 | Bloecker | B21C 37/292 29/421.1 |
| 5,716,586 A | 2/1998 | Taniguchi | |
| 2003/0187568 A1 | 10/2003 | Yasui et al. | |
| 2011/0214569 A1* | 9/2011 | Gonze | B01D 46/42 95/278 |
| 2013/0305698 A1* | 11/2013 | Yoshioka | F01N 3/2026 60/300 |
| 2014/0190151 A1* | 7/2014 | Culbertson | F01N 13/008 60/303 |

FOREIGN PATENT DOCUMENTS

| | | |
|---|---|---|
| CN | 102047752 | 5/2011 |
| CN | 102251837 | 11/2011 |
| CN | 102691552 | 9/2012 |
| CN | 104969004 | 10/2015 |
| FR | 2851404 | 8/2004 |
| JP | S59192928 | 11/1984 |
| JP | H 6-50135 A | 2/1994 |
| JP | H 6-336915 A | 12/1994 |
| JP | H 7-11946 A | 1/1995 |
| JP | H 8-193513 A | 7/1996 |
| JP | H 10-141046 A | 5/1998 |
| JP | 2003-31516 A | 2/2003 |
| JP | 2009-238375 A | 10/2009 |
| JP | 2012-225163 A | 11/2012 |
| JP | 2015-98408 A | 5/2015 |
| WO | 2012012519 | 1/2012 |
| WO | 2012100992 | 8/2012 |

* cited by examiner

SYSTEM AND METHOD FOR AXIAL ZONING OF HEATING POWER

CROSS-REFERENCE TO RELATED APPLICATIONS

This application claims priority to and the benefit of U.S. patent application Ser. No. 15/448,044, filed on Mar. 2, 2017, which claims priority to and the benefit of U.S. provisional application Ser. No. 62/302,482, filed on Mar. 2, 2016, the contents of U.S. patent application Ser. No. 15/448,044 and U.S. provisional application Ser. No. 62/302,482 are incorporated herein by reference in their entirety. This application is also related to the following applications: U.S. application Ser. No. 15/448,186 titled "Bare Heating Elements for Heating Fluid Flows," U.S. Pat. No. 1,0544,722 titled "Virtual Sensing System," U.S. application Ser. No. 15/447,964 titled "Heater Element as Sensor for Temperature Control in Transient Systems," U.S. application Ser. No. 15/447,994 titled "Heater Element Having Targeted Decreasing Temperature Resistance Characteristics," U.S. application Ser. No. 15/448,068 titled "Dual-Purpose Heater and Fluid Flow Measurement System," U.S. application Ser. No. 15/448,162 titled "Heater-Actuated Flow Bypass," U.S. Pat. No. 10,470,247 titled "Susceptor for Use in a Fluid Flow System," and U.S. application Ser. No. 15/448,130 titled "Thermal Storage Device for Use in a Fluid Flow System," all of which were filed on Mar. 2, 2017 and are commonly assigned with the present application, the contents of which are incorporated herein by reference in their entirety.

FIELD

The present disclosure relates to heating and sensing systems for fluid flow applications, for example vehicle exhaust systems, such as diesel exhaust and aftertreatment systems.

BACKGROUND

The statements in this section merely provide background information related to the present disclosure and may not constitute prior art.

The use of physical sensors in transient fluid flow applications such as the exhaust system of an engine is challenging due to harsh environmental conditions such as vibration and thermal cycling. One known temperature sensor includes a mineral insulated sensor inside a thermowell that is then welded to a support bracket, which retains a tubular element. This design, unfortunately, takes a long amount of time to reach stability, and high vibration environments can result in damage to physical sensors.

Physical sensors also present some uncertainty of the actual resistive element temperature in many applications, and as a result, large safety margins are often applied in the design of heater power. Accordingly, heaters that are used with physical sensors generally provide lower watt density, which allows a lower risk of damaging the heater at the expense of greater heater size and cost (same heater power spread over more resistive element surface area).

Moreover, known technology uses an on/off control or PID control from an external sensor in a thermal control loop. External sensors have inherent delays from thermal resistances between their wires and sensor outputs. Any external sensor increases the potential for component failure modes and sets limitations of any mechanical mount to the overall system.

One application for heaters in fluid flow systems is vehicle exhausts, which are coupled to an internal combustion engine to assist in the reduction of an undesirable release of various gases and other pollutant emissions into the atmosphere. These exhaust systems typically include various after-treatment devices, such as diesel particulate filters (DPF), a catalytic converter, selective catalytic reduction (SCR), a diesel oxidation catalyst (DOC), a lean $NO_x$ trap (LNT), an ammonia slip catalyst, or reformers, among others. The DPF, the catalytic converter, and the SCR capture carbon monoxide (CO), nitrogen oxides ($NO_x$), particulate matters (PMs), and unburned hydrocarbons (HCs) contained in the exhaust gas. The heaters may be activated periodically or at a predetermined time to increase the exhaust temperature and activate the catalysts and/or to burn the particulate matters or unburned hydrocarbons that have been captured in the exhaust system.

The heaters are generally installed in exhaust pipes or components such as containers of the exhaust system. The heaters may include a plurality of heating elements within the exhaust pipe and are typically controlled to the same target temperature to provide the same heat output. However, a temperature gradient typically occurs because of different operating conditions, such as different heat radiation from adjacent heating elements, and exhaust gas of different temperature that flows past the heating elements. For example, the downstream heating elements generally have a higher temperature than the upstream elements because the downstream heating elements are exposed to fluid having a higher temperature that has been heated by the upstream heating elements. Moreover, the middle heating elements receive more heat radiation from adjacent upstream and downstream heating elements.

The life of the heater depends on the life of the heating element that is under the harshest heating conditions and that would fail first. It is difficult to predict the life of the heater without knowing which heating element would fail first. To improve reliability of all the heating elements, the heater is typically designed to be operated with a safety factor to reduce and/or avoid failure of any of the heating elements. Therefore, the heating elements that are under the less harsh heating conditions are typically operated to generate a heat output that is much below their maximum available heat output.

SUMMARY

The present disclosure provides for a heater system for an exhaust system including a heater disposed in an exhaust conduit of the exhaust system. The heater includes a plurality of heating elements disposed along an axial direction of the exhaust conduit. The heater system includes a heater control module operable to control at least two of the plurality of heating elements differently with respect to each other according to at least one operating condition specific to at least two of the plurality of heating elements.

In another form, a heater system for an exhaust system is provided that includes a heater disposed in an exhaust conduit of the exhaust system. The heater includes a plurality of zones disposed along an axial direction of the exhaust conduit. The system further includes a heater control module operable to control at least two of the plurality of heating zones differently with respect to each other and according to at least one operating condition specific to at least two of the plurality of heating zones.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
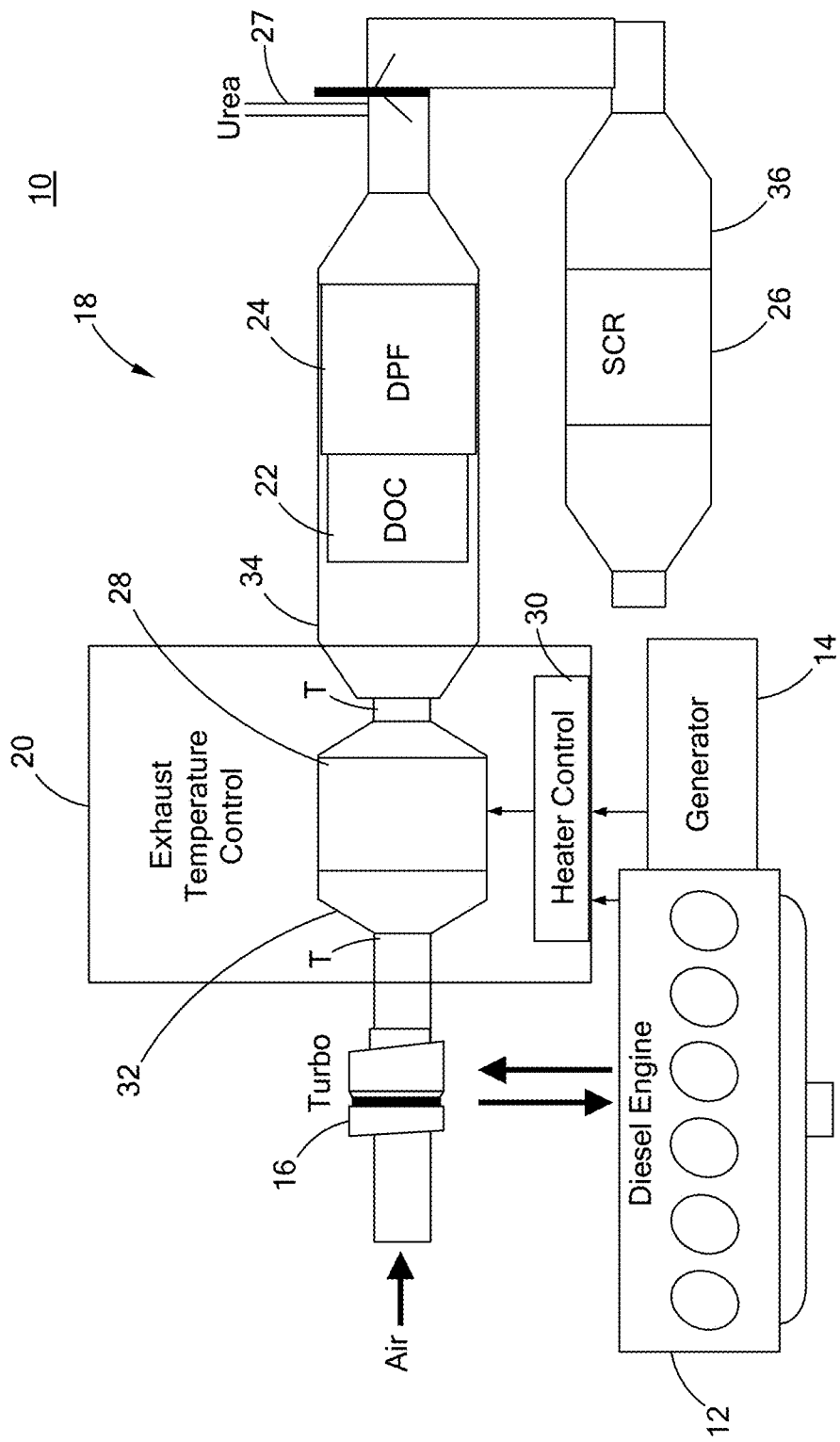
FIG. 1 is a schematic diagram of a diesel engine and exhaust aftertreatment system in which the principles of the present disclosure are applied.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1, an exemplary engine system 10 generally includes a diesel engine 12, an alternator 14 (or generator in some applications), a turbocharger 16, and an exhaust aftertreatment system 18. The exhaust aftertreatment system 18 is disposed downstream from a turbocharger 16 for treating exhaust gases from the diesel engine 12 before the exhaust gases are released to atmosphere. The exhaust aftertreatment system 18 can include one or more additional components, devices, or systems operable to further treat exhaust fluid flow to achieve a desired result. In the example of FIG. 1, the exhaust aftertreatment system 18 includes a heating system 20, a diesel oxidation catalyst (DOC) 22, a diesel particulate filter device (DPF) 24, and a selective catalytic reduction device (SCR) 26. The exhaust aftertreatment system 18 includes an upstream exhaust conduit 32 that receives a heater assembly 28 therein, an intermediate exhaust conduit 34 in which the DOC 22 and DPF 24 are provided, and a downstream exhaust conduit 36 in which the SCR 26 is disposed.

It should be understood that the engine system 10 illustrated and described herein is merely exemplary, and thus other components such as a $NO_x$ adsorber or ammonia oxidation catalyst, among others, may be included, while other components such as the DOC 22, DPF 24, and SCR 26 may not be employed. Further, although a diesel engine 12 is shown, it should be understood that the teachings of the present disclosure are also applicable to a gasoline engine and other fluid flow applications. Therefore, the diesel engine application should not be construed as limiting the scope of the present disclosure. Such variations should be construed as falling within the scope of the present disclosure.

The heating system 20 includes a heater assembly 28 disposed upstream from the DOC 22, and a heater control module 30 for controlling operation of the heater assembly 28. Heater assembly 28 can include one or more electric heaters wherein each electric heater includes at least one resistive heating element. The heater assembly 28 is disposed within an exhaust fluid flow pathway in order to heat the fluid flow during operation. Heater control module 30 typically includes a control device adapted to receive input from the heater assembly 28. Examples of controlling the operation of the heater assembly 28 can include turning the heater assembly on and off, modulating power to the heater assembly 28 as a single unit and/or modulating power to separate subcomponents, such as individual or groups of resistive heating elements, if available, and combinations thereof.

In one form, the heater control module 30 includes a control device. The control device is in communication with at least one electric heater of the heater assembly 28. The control device is adapted to receive at least one input including but not limited to an exhaust fluid flow, mass velocity of an exhaust fluid flow, flow temperature upstream of the at least one electric heater, flow temperature downstream of the at least one electric heater, power input to the at least one electric heater, parameters derived from physical characteristics of the heating system, and combinations thereof. The at least one electric heater can be any heater suitable to heat an exhaust fluid. Example electric heaters include but are not limited to a band heater, a bare wire resistive heating element, a cable heater, a cartridge heater, a layered heater, a strip heater, and a tubular heater.

The system of FIG. 1 includes the DOC 22 disposed downstream from the heater assembly 28. The DOC 22 serves as a catalyst to oxidize carbon monoxide and any unburnt hydrocarbons in the exhaust gas. In addition, the DOC 22 converts nitric oxide (NO) into nitrogen dioxide ($NO_2$). The DPF 24 is disposed downstream from the DOC 22 to assist in removing diesel particulate matter (PM) or soot from the exhaust gas. The SCR 26 is disposed downstream from the DPF 24 and, with the aid of a catalyst, converts nitrogen oxides (NOx) into nitrogen ($N_2$) and water. A urea water solution injector 27 is disposed downstream from the DPF 24 and upstream from the SCR 26 for injecting urea water solution into the stream of the exhaust gas. When urea water solution is used as the reductant in the SCR 26, NOx is reduced into $N_2$, $H_2O$ and $CO_2$.

Figure 2:
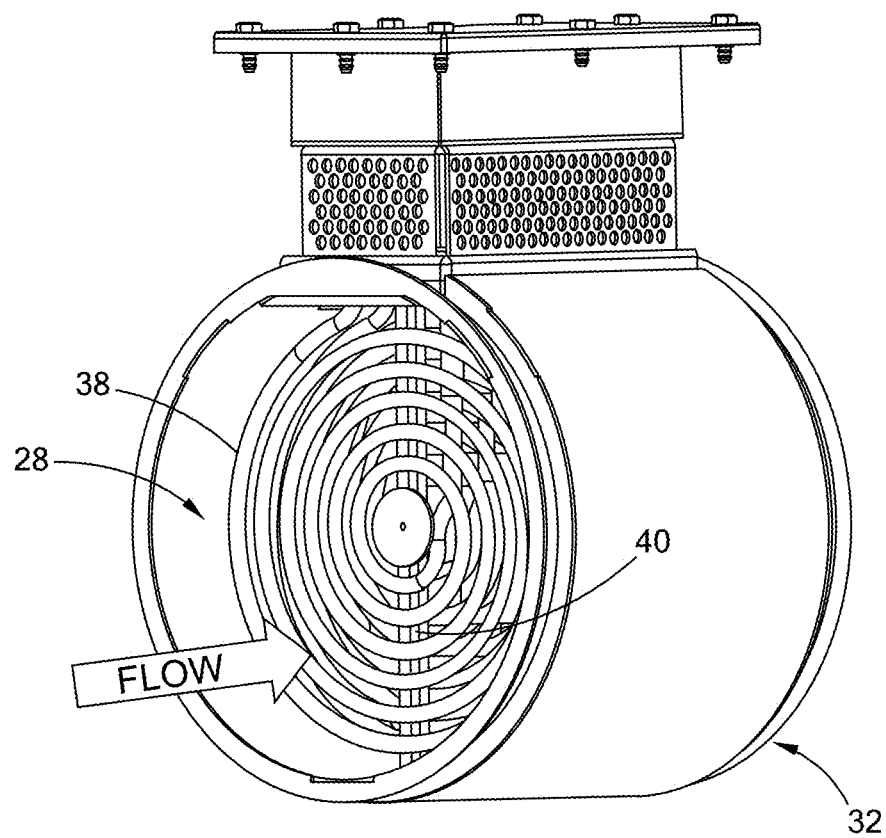
FIG. 2 is a perspective view of a heater assembly installed in an upstream exhaust conduit and constructed according to the teachings of the present disclosure.
Figure 3:
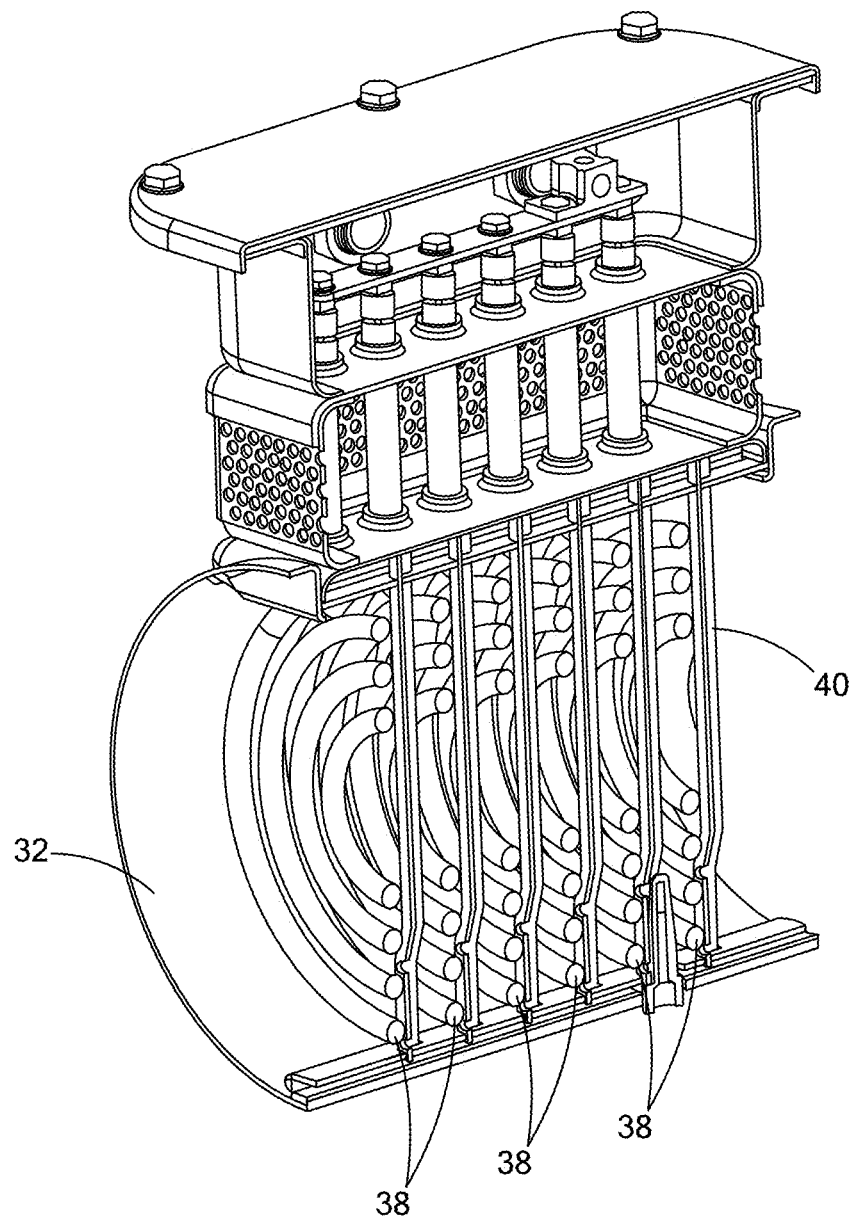
FIG. 3 is a perspective, cross-sectional view of the heater assembly installed in an upstream exhaust conduit of FIG. 2.

Referring to FIGS. 2 and 3, one form of the heater assembly 28 is shown to be disposed in the exhaust conduit 32 and includes a plurality of heating elements 38. The heating elements 38 may be in the form of heating coils, such as a tubular heater as illustrated herein, arranged along a longitudinal axis X of the upstream exhaust conduit 32. The plurality of heating elements 38 may be provided in any type of construction such as a band heater, a bare wire resistive heating element assembly, a cable heater, a cartridge heater, a layered heater, a strip heater, or a tubular heater, among others. Accordingly, the illustration of a tubular heater should not be construed as limiting the scope of the present disclosure. In one form, the heater assembly 28 is mounted to the upstream exhaust conduit 32 by brackets 40. In another form, the heater assembly 28 may include a plurality of heating zones disposed along an axial direction of the upstream exhaust conduit. Each heating zone includes at least one resistive heating element.

The plurality of heating elements 38 may exhibit predetermined performance characteristics by measurement or estimation. The performance characteristics of the plurality of heating elements 38 include a heat flux density for the plurality of heating elements 38 at a given voltage or under a specified process flow condition. Heat flux is the rate of heat energy transfer through a given surface per unit time. Heat flux density is the heat rate per unit area as measured in Watt density (watts/mm$^2$). Heat flux or heat flux density provides useful information for predicting performance of the plurality of heating elements 38, including temperature, transfer efficiency, and life (and consequently reliability). A heating element 38 with a higher flux density generally provides a faster temperature rise and has a smaller surface area (and consequently lower manufacturing costs) than a heating element 38 with a lower higher flux density. However, a heating element 38 with a higher flux density generally has a reduced life and lower reliability due to higher thermal stress and fatigue.

Figure 4:
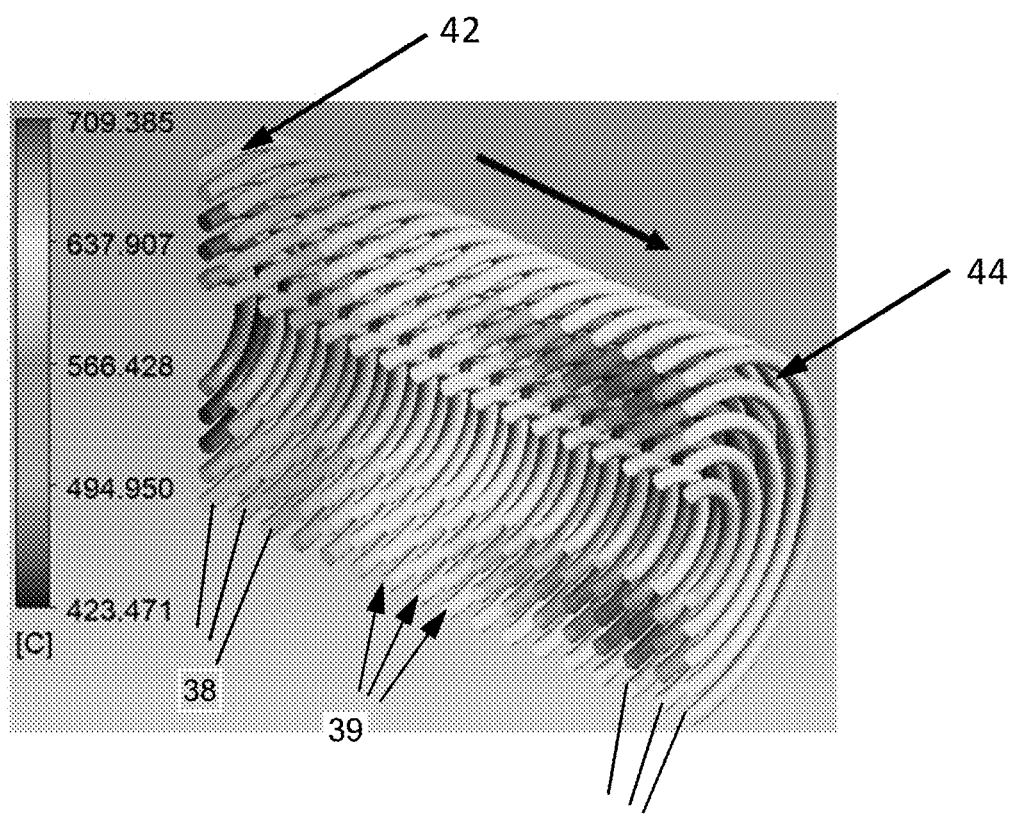
FIG. 4 is a perspective, cross-sectional view of another heater assembly, showing a temperature distribution in the flow direction.

Referring to FIG. 4, when the exhaust gas flows through the heater assembly 28 including a plurality of heating elements 38, the temperature of the exhaust gas at the upstream heating elements 42 is generally lower than that of the exhaust gas at the downstream heating elements 44. If the upstream and downstream heating elements 42, 44 are controlled to generate the same heat flux, the upstream heating elements 42 generally has a lower temperature than the downstream heating element 44 because the flow upstream of the heating elements 38 has not been heated. However, if the upstream heating elements 42 are controlled to the same temperature to output higher heat flux density than the downstream heating element 44, the increased heat flux density at the upstream heating elements 42 will cause higher heating and cooling rates for the upstream heating elements 42 at various points in the cycle, leading to higher thermal stress and shorter life due to thermal fatigue.

Therefore, instead of simply increasing the heat flux density of the upstream heating elements 42, the heater control module 30 of the present disclosure actively controls the plurality of heating elements 38 independently to provide a desired heating cycle, heating rate, and target temperature, based on operating parameters specific to the plurality of heating elements 38, taking into consideration the thermal gradient across the plurality of heating elements 38 and the different heat radiation, to improve heater performance while providing improved reliability. It should be understood that the heater control module 30 may control at least two of the heating elements 38 independently, or any of a plurality of heating elements 38 independently, or each of the heating elements 38 independently while remaining within the scope of the present disclosure.

The plurality of heating elements 38 may be designed to have the same physical properties, and consequently the same heat flux density at a given power level, to simplify manufacturing and control of the heater assembly 28. Alternatively, the plurality of heating elements 38 may be designed to have different sizes and physical properties to provide different watt densities at a given power level. In either case, the plurality of heating elements 38 are controlled by the heater control module 30 to provide different heat flux densities in view of the thermal gradient and heat radiation for improved reliability of the heater assembly 28.

Figure 5:
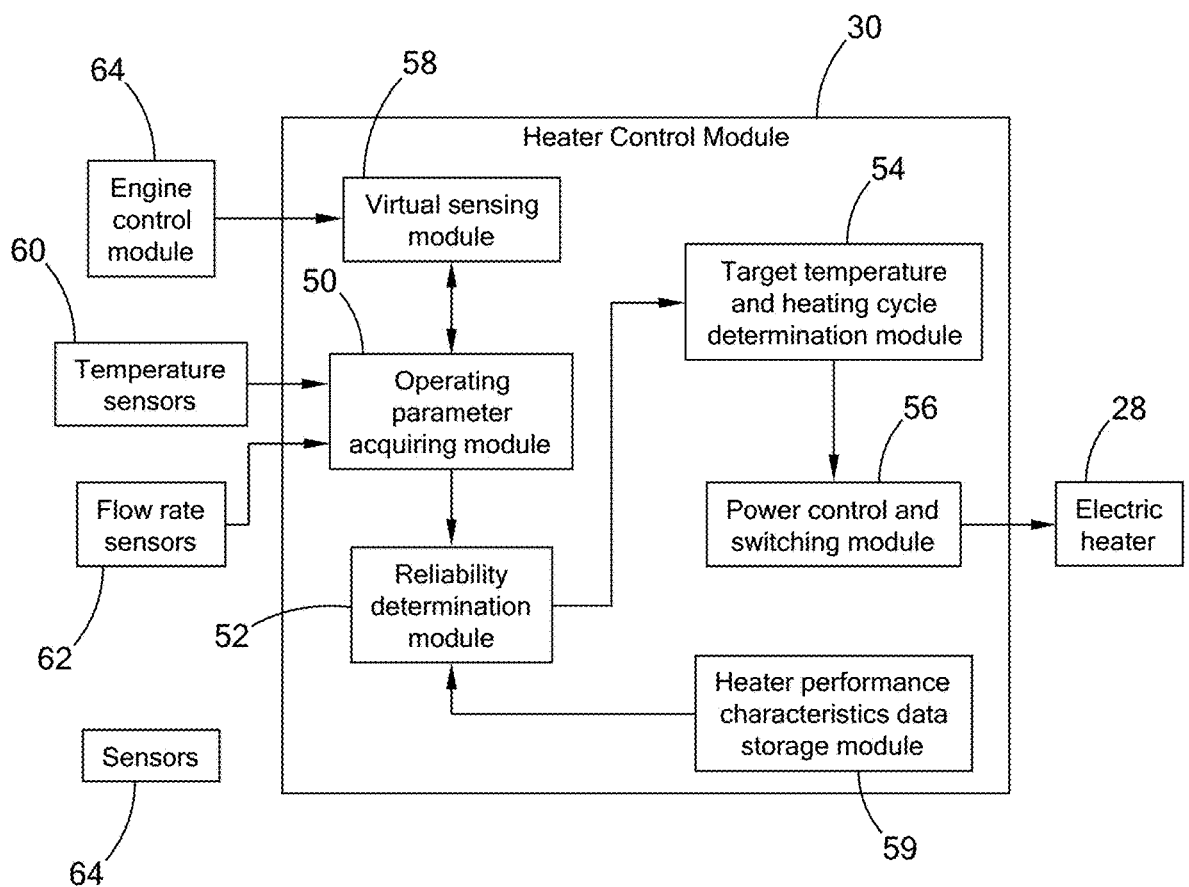
FIG. 5 is a schematic view of a heater control module of a heating system constructed and operating in accordance with the teachings of the present disclosure.

Referring to FIG. 5, the heater control module 30 controls the plurality of heating elements 38 of the heater assembly 28 differently with respect to each other according to at least one operating condition specific to each of the plurality of heating elements 38 to achieve improved heating performance and reliability. The heater control module 30 includes an operating parameter acquiring module 50, a reliability determination module 52, a target temperature and heating cycle determination module 54, and a power control and switching module 56. Optionally, the heater control module 30 may include a virtual sensing module 58 and a heater performance characteristics data storage module 59 set forth above. It should also be understood that the various modules, including by way of example the reliability determination module 52, the target temperature and heating cycle determination module 54, and the virtual sensing module 58, among others, may be optional.

The operating parameters acquiring module 50 acquires operating parameters specific to at least one of the plurality of heating elements 38 from a plurality of sensors 60, 62, 64. The parameters include, but are not limited to, temperature of the heating element 38 measured by a temperature sensor 60 (or calculated), and the flow rate of the exhaust gas measured by a flow rate sensor 62.

The virtual sensing module 64 may receive data from an engine control module (ECM) 64 to estimate or predict some operating parameters, resulting in a virtual sensing of some of the operating parameters. For example, the data obtained from the ECM 64 may include exhaust flow rate and heater inlet temperature. The virtual sensing module 58 may estimate the heater outlet temperature based on the data from the ECM 64. The estimated data can be sent to the operating parameter acquiring module 50 for a more accurate reliability estimation.

In some applications, the exhaust system may be operated under different modes such as normal (no active regeneration but possibly passive regeneration); heating mode (or warm-up mode)—the engine raises aftertreatment temperature to achieve active regeneration; cold mode (or cold start mode)—NOx is actively stored in a low-temperature condition; heavy load mode—allows the release of the stored NOx, at higher exhaust temperatures. Additional modes of operation are described in U.S. published patent application no. 2014/0130481, which is hereby incorporated by reference in its entirety.

The virtual sensing module 58 can receive operating parameters of at least one of the plurality of heating elements 38. For instance, the virtual sensing module 58 can receive information about a particular mode and estimate outlet temperature of each heating element 38 to increase accuracy of potential heat flux density available to each heating element 38. Therefore, the virtual sensing module 58 may estimate a temperature coming out of each heating element 38, which is the inlet temperature to the next heating element 38, instead of only knowing the inlet temperature used for each heating element 38. The temperature estimation may be based on energy balance (conservation of energy) to predict the outlet temperature of each heating element 38, including losses to the surrounding environment.

The reliability determination module 52 determines reliability of each heating element 38 for a particular power level based on the operating parameters specific to each heating element 38. The reliability determination module 52 may receive data from the heater performance characteristics data storage module 59 that stores performance characteristics data specific to the individual heating elements 38. While the plurality of heating elements 38 may be manufactured according to the same specifications, each heating element 38 may not provide the same heating performance, such as heat flux density, due to manufacturing variations and deviations. Therefore, parameters relating to manufacturing variations and deviations may be predetermined and stored in the heater performance characteristics data storage module 59 and are provided to the reliability determination module 52 for a more accurate reliability calculation.

The reliability of each heating element 38 may also be affected by other factors, such as vibration or physical loads imposed by the mounting bracket 40 that mounts the heater assembly 28 to the upstream exhaust conduit 32. Whether a heating element 38 also serves as a structural member affects the reliability of the heating element 38. Therefore, the effects of these factors may be pre-stored in the heater performance characteristics data storage module 59 for a more accurate reliability determination.

The reliability determination module 52 may determine the expected reliability for the plurality of heating elements 38 based on a relationship between the reliability and the operating parameters. This relationship may be directly available for an upstream heating element 42 based on empirical data or experimentation. For example, the relationship may be obtained by performing Calibrated Accelerated Life Testing (CALT) of the heating element 38. Accelerated life testing is the process of testing a product by subjecting it to conditions such as stress, strain, temperatures etc. in excess of its normal service parameters in an effort to uncover faults and potential modes of failure in a short amount of time. In the present form, CALT may be used to provide a relationship between the heating cycle and the time for a given power level or a given operating environment. Therefore, CALT provides a relationship between reliability and the operating parameters for each heating element 38. The reliability data may be provided only for the heating element 38 that experiences more harsh operating conditions.

After the reliability of the upstream and downstream heating elements 42, 44 is determined, the reliability determination module 52 determines the average reliability by averaging the reliability of the upstream and downstream heating elements 42, 44. The information regarding the average reliability is sent to the target temperature and heating cycle determination module 54.

The target temperature and heating cycle determination module 54 calculates the target temperature of the upstream and downstream heating elements 42, 44 as well as the heating cycle based on the same average reliability. The target temperature would allow the plurality of heating element 38 to achieve the same average reliability. For intermediate heating elements 39, interpolation between the values from the upstream and downstream heating elements 42, 44 may be used to determine a target temperature.

The target temperature and heating cycle determination module 54 calculates target temperatures for each heating element 38 to obtain the same average reliability for a given desired power level and flow rate. The target temperature may be constantly updated in response to a change in power level that may change over time, among changes in other system variables. This dynamic calculation would allow a more accurate determination of the target temperatures for a heating element 38 based on a plurality of parameters, including but not limited to actual flow rate, power level, and design values for these quantities. Therefore, the reliability of a given heater assembly 28 in an operating heating system 20 can be improved.

The target temperature and heating cycle determination module 54 can also perform a real-time target temperature calculation for improved reliability. For example, the reliability determination module 52 may determine the effect of di/dt (change in current over time, or dV/dt, change in voltage over time) on heater reliability and the impact of switching frequency for a desired power level. The target temperature and heating cycle determination module 54 then determines a target temperature corresponding to the desired power level with higher reliability. The target temperature and heating cycle determination module 54 also determines the number of heating cycles to maintain the particular target temperatures for the various heating elements 38 to produce the desired power level with higher reliability.

In another form, the target temperature and heating cycle determination module 54 may be two modules. The power control and switching module 58 controls the power level provided to each heating element 38 and switches the heating elements 38 based on the calculated heating cycle to achieve the target temperature. The power control and switching module 56 controls switching of the heating elements 38 between an "on" state and an "off" state based on the calculated heating cycle. The average power density can be reduced to a level to provide improved reliability of the heating elements 38. Faster switching would generally facilitate longer life, but the rate of switching can be selected to improve durability. Each heating element 38 can be controlled to have a maximum average heat flux density while ensuring optimum reliability of the heating elements 38.

The heater control module 30 controls and varies heat flux density of the heating elements 38 based on their axial position in the upstream exhaust conduit 32 to maintain a constant durability across the plurality of heating elements 38 while increasing the total combined heat flux density across all heating elements 38. The varied heat flux density from the first to subsequent heating elements 38 can maintain a constant durability and increase power within a smaller physical space by setting the target temperature differently in different zones. Accordingly, the heating elements 38 can be operated to provide increased available heat flux density while maintaining constant durability/reliability across the plurality of heating elements 38. A safety factor may not be required because the operating parameters specific to a particular heating element 38 are closely monitored and the heat output for optimum reliability is constantly adjusted.

The plurality of heating elements 38 may be controlled to have different target temperatures, thereby generating different heat output (heat flux density) to maintain a uniform temperature of the plurality of heating elements 38, taking into consideration of parameters specific to each heating element 38. Each heating element 38 can be designed to have the same large heat flux density and can be turned on to full-power at the same time during engine cold start. After the heating elements 38 reach the target temperature, the heating elements 38 can be switched down to an appropriate power level to maintain the heating element 38 at the target temperature. Therefore, the heater assembly 28 can generate a larger heat flux density to rapidly heat the exhaust gas and the individual heating elements 38 may be turned off when safety limits are reached.

Figure 6:
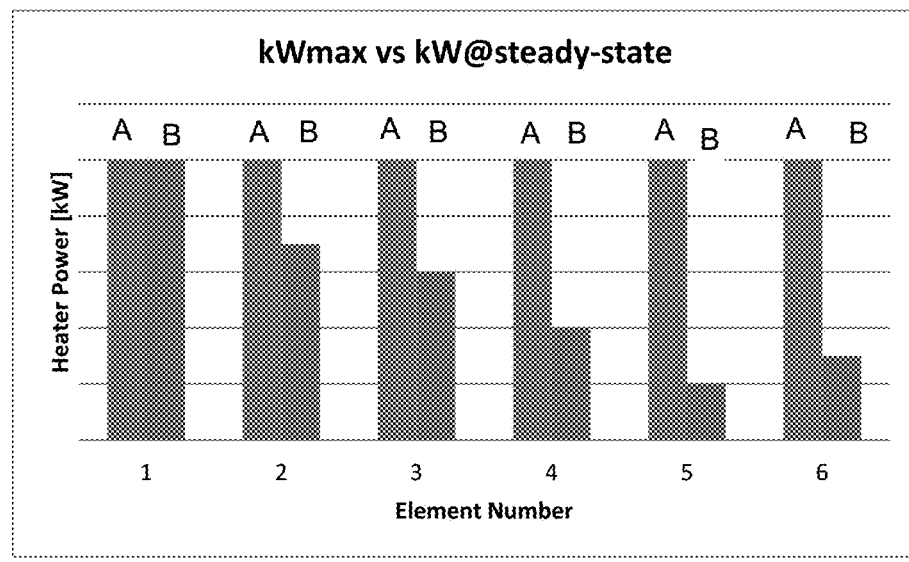
FIG. 6 is a graph comparing the maximum available power and actual power output of each heating element to achieve a uniform temperature across the heating elements of the heater assembly.

Referring to FIG. 6, the graphs show the heater assembly 28 that includes a plurality of axially arranged heating elements 38 can have each heating element 38 designed to have the same high-power level, as indicated by bars A. The heating elements 38 can be switched down to the appropriate level, as indicated by bars B, when the material temperature limits are reached, or other operating parameters dictate reduced power. Bars B also indicate the heater power of each heating element 38 at steady state or a simple transient that maintains a constant sheath temperature. Durability of each heating element 38 may be affected by number and magnitude of thermal cycles as well as a transient condition, such as di/dt (change in current over time). The maximum kW for each heating element 38 can vary based on transient conditions. For example, a much higher power density can be utilized for a shorter period of time when the heating element 38 is cold. The power density can be reduced as time increases. In addition, the rate of applying power to the heating elements 38 can be adjusted to be slower to prevent damage to the heater assembly 28. Therefore, the heater control module 30 includes a control algorithm to take the transient condition of at least one of the plurality of heating elements 38 into consideration to improve durability/reliability. By using a heater control module 30 to control turning on and off and powering up and down of the individual heating elements 38, the heater performance can be optimized based on operating conditions and limitations on the heater structure such as capacity or durability, thereby obtaining an optimum reliability of all heating elements 38.

The present disclosure has the advantages of generating more heat flux density in a smaller area. The increased heat flux density can result in reduced size of the heating elements 38, a reduced cost of the heating elements 38 and faster heating during engine cold start. Therefore, the present disclosure balances the reliability, size and power output of the heating elements 38 for a multi-zone heater assembly 28, thereby achieving an improved heating result.

The present disclosure can also accommodate transient conditions, as well as provide a better adaptation to a failed heating element 38. If a heating element 38 or its related power components fail, the remaining heating elements 38 can be controlled to supply a portion of the lost power. When a heating element 38 has a lower reliability, or if the heating element 38 fails, the particular heating element 38 can be powered to reduce the heat flux density. The output of the remaining heating elements 38 can be adjusted to compensate for the reduced heat flux from the particular heating element 38. Therefore, the entire heater assembly 28 can still generate the desired overall power output without subjecting the particular heater to reduced reliability.

In yet another form of the present disclosure, the heating elements 38 can be controlled to provide a desired increased watt density (having smaller sizes, thereby reducing manufacturing costs). The heat flux output from the individual heating elements 38 may be controlled differently and adjusted during operation according to the operating data acquired by the operating parameters acquiring module 50. The heat flux from each heating element 38 may be changed by using the power control and switching module 56 to switch the heating elements 38 "on" and "off" to achieve a desired heat flux and improved reliability. The heating system 20 allows for a smaller (thus less costly) heating element 38 for a given power level and desired reliability level. For each heating element 38, the temperature of the heating element 38, the difference between the maximum and minimum temperature, the maximum cooling rate, the number of heating cycles (both "control cycles" and "machine cycles"), and the maximum power or heating rate can be tracked over time. The heat output from the heating elements 38 may be adjusted according to these varied parameters.

Although a fluid flow application of a diesel exhaust has been illustrated and described herein, it should be understood that the various forms of axial heating may be applied to any number of applications and to provide a variety of heating/power distributions, or system functionality, along a fluid flow. For example, axial heating could be employed to vary power density from one heating element to subsequent heater elements in order to increase power in a smaller physical space. In another form, power density could be varied to maintain a constant element sheath or wire temperature. Still further, a map of axial power distribution at different engine speeds and torques could be created, and then power variations could be controlled based on actual engine conditions in use. Accordingly, the various forms illustrated and described herein should not be construed as limiting the scope of the present disclosure.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A heater system for an exhaust system of an internal combustion engine, the heater system comprising:
   a heater disposed in an exhaust conduit of the exhaust system, the heater including a plurality of heating elements disposed along an axial direction of the exhaust conduit; and
   a heater control module operable to actively control power being supplied to at least two heating elements among the plurality of heating elements differently with respect to each other according to at least one operating condition specific to the at least two heating elements among the plurality of heating elements,
   wherein the at least two heating elements includes a first upstream heating element and a first downstream heating element and the heater control module controls the first upstream heating element to be at a higher power level than the first downstream heating element.

2. The heater system according to claim 1, wherein the plurality of heating elements includes a plurality of upstream heating elements, including the first upstream heating element, that are disposed upstream in the exhaust conduit and a plurality of downstream heating elements, including the first downstream element, that are disposed downstream in the exhaust conduit.

3. The heater system according to claim 2, wherein the heater control module controls the plurality of upstream heating elements at a higher power level than the plurality of downstream heating elements.

4. The heater system according to claim 3, wherein the heater control module includes an operating parameter acquiring module operable to acquire operating parameters of at least one heating element of the plurality of heating elements.

5. The heater system according to claim 3, wherein the heater control module includes a virtual sensing module operable to acquire operating parameters of at least one heating element of the plurality of heating elements.

6. The heater system according to claim 3, wherein the heater control module includes a heater performance characteristics data storage module operable to store operating parameters of at least one heating element of the plurality of heating elements.

7. The heater system according to claim 3, wherein the heater control module includes a reliability determination module operable to determine reliability of at least one heating element of the plurality of heating elements according to operating conditions of the at least one heating element of the plurality of heating elements.

8. The heater system according to claim 7, wherein the reliability determination module determines an average reliability of the plurality of heating elements.

9. The heater system according to claim 7, wherein the heater control module includes a target temperature and heating cycle determination module operable to determine a target temperature for each heating element based on one of the following: the determined reliability, a different target temperature, a heating cycle, or combinations thereof.

10. The heater system according to claim 9, wherein the heater control module includes a power control and switching module operable for controlling a power level provided to each heating element of the plurality of heating elements and switching each heating element of the plurality of heating elements on and off based on the determined heating cycle sufficient to achieve the target temperature.

11. The heater system according to claim 3, wherein the heater control module includes a control algorithm to determine transient conditions of at least one heating element of the plurality of heating elements.

12. The heater system according to claim 3, wherein the heater control module is operable to control each heating element of the plurality of heating elements to reach one of the following: a different target temperature, a different heating cycle, or combinations thereof.

13. The heater system according to claim 1, wherein the heater control module is configured to provide power to the first upstream heating element at the same time as providing power to the first downstream heating element so that the first upstream heating element is at the higher power level than the first downstream heating element.

14. A heater system for an exhaust system of an internal combustion engine, the heater system comprising:
 a heater disposed in an exhaust conduit of the exhaust system, the heater including a plurality of heating zones disposed along an axial direction of the exhaust conduit; and
 a heater control module operable to actively control power being supplied to at least two heating zones among the plurality of heating zones differently with respect to each other and according to at least one operating condition specific to the at least two heating zones among the plurality of heating zones,
 wherein the at least two heating zones includes a first upstream heating zone and a first downstream heating zone and the heater control module controls the first upstream heating zone to be at a higher power level than the first downstream heating zone.

15. The heater system according to claim 14, wherein the plurality of heating zones includes a plurality of upstream heating zones, including the first upstream heating zone, that are disposed upstream in the exhaust conduit and a plurality of downstream heating zones, including the first downstream heating zone, that are disposed downstream in the exhaust conduit.

16. The heater system according to claim 15, wherein the heater control module controls the plurality of upstream heating zones at a higher power level than the plurality of downstream heating zones.

17. The heater system according to claim 16, wherein the heater control module includes a reliability determination module operable to determine reliability of at least one heating zone of the plurality of heating zones according to the operating conditions of at least one heating zone of the plurality of heating zones.

18. The heater system according to claim 17, wherein the heater control module includes a target temperature and heating cycle determination module operable to determine a target temperature for each heating zone based on one of the following: the determined reliability, a target temperature, a heating cycle, or combinations thereof.

19. The heater system according to claim 18, wherein the heater control module includes a power control and switching module operable to control power provided to the heater and switching on and off each heating zone of the plurality of heating zones based on the determined heating cycle sufficient to achieve the target temperature.

20. The heater system according to claim 16, wherein the heater control module is operable to actively control each heating zone of the plurality of heating zones to reach one of the following: different target temperatures, different heating cycles, or combinations thereof.

* * * * *